United States Patent [19]

Otsuka et al.

[11] Patent Number: 4,819,714

[45] Date of Patent: Apr. 11, 1989

[54] AIR CONDITIONING APPARATUS

[75] Inventors: Nobuo Otsuka, Kamakura, Japan; Peter F. Thompson, Cypress, Calif.; Seiji Wada, Kamakura, Japan

[73] Assignee: Mitsubishi Denki Kabushiki Kaisha, Tokyo, Japan

[21] Appl. No.: 947,283

[22] Filed: Dec. 29, 1986

[30] Foreign Application Priority Data

Sep. 22, 1986 [JP] Japan .................................. 61-224373

[51] Int. Cl.$^4$ ...................... G05D 23/00; F24F 3/044; F25B 29/00

[52] U.S. Cl. ........................................ 165/12; 165/22; 236/46 R; 236/51; 236/94; 364/557

[58] Field of Search ........................ 165/11.1, 12, 22; 236/46 R, 51, 94; 364/557

[56] References Cited

U.S. PATENT DOCUMENTS

| | | | |
|---|---|---|---|
| 4,071,745 | 1/1978 | Hall | 165/22 |
| 4,212,078 | 7/1980 | Games et al. | 165/22 |
| 4,217,646 | 8/1980 | Caltagirone et al. | 165/22 |
| 4,235,368 | 11/1980 | Neel . | |
| 4,264,034 | 4/1981 | Hyltin et al. . | |
| 4,298,163 | 11/1981 | Richardson et al. | 236/51 |
| 4,308,911 | 1/1982 | Mandl | 165/22 |
| 4,319,711 | 3/1982 | Barker et al. . | |
| 4,388,692 | 6/1983 | Jones et al. | 165/12 |
| 4,442,972 | 4/1984 | Sahay et al. . | |
| 4,530,395 | 7/1985 | Parker et al. . | |
| 4,621,336 | 11/1986 | Brown | 364/557 |
| 4,646,964 | 3/1987 | Parker et al. | 165/11.1 |

FOREIGN PATENT DOCUMENTS

| | | | |
|---|---|---|---|
| 0123240 | 9/1979 | Japan | 236/94 |
| 2040080 | 8/1980 | United Kingdom | 236/46 R |
| 2137770 | 10/1984 | United Kingdom | 165/22 |
| 2152255 | 7/1985 | United Kingdom | 236/51 |

OTHER PUBLICATIONS

Behnsch et al., "Computer-Controlled Automatic Comparison Measurements of Resistance Thermometers up to 464° C." IEEE Transactions on Instrumentation and Measurements, vol. IM-29, No. 4, Dec. 1980, pp. 334-337.

Primary Examiner—Albert W. Davis, Jr.
Assistant Examiner—John K. Ford
Attorney, Agent, or Firm—Oblon, Fisher, Spivak, McClelland & Maier

[57] ABSTRACT

A controlling system for an air conditioning apparatus includes a controlling apparatus, a main controller and room controller provided in each room. In the main controller, an operation mode changing means control the operations of a heat source device, an air blower and other devices through a controlling apparatus so that they perform any operation mode of "stop", "cooling", "warming", or "air blowing"; a temperature schedule inputting means is adapted to input a temperature schedule for each room by operating time keys and a temperature key; an interactive input means is to input initial data necessary to the operation of the system in a way of dialogue by operating "YES" key and "NO" key; a first display means is to display questions necessary to input the initial data and a temperature schedule; a schedule selecting means is to select a method of air-conditioning of the room provided with a main controller in accordance with information inputted by a schedule key; In the room controller, a mode selecting means is to select a method of air-conditioning of the room provided with a room controller in accordance with information inputted by a mode key; a room temperature setting means is to determine the room temperature of a room so that the room temperature is brought to a value inputted by a room temperature setting key, and a second displaying means is to display a room temperature and other information.

21 Claims, 6 Drawing Sheets

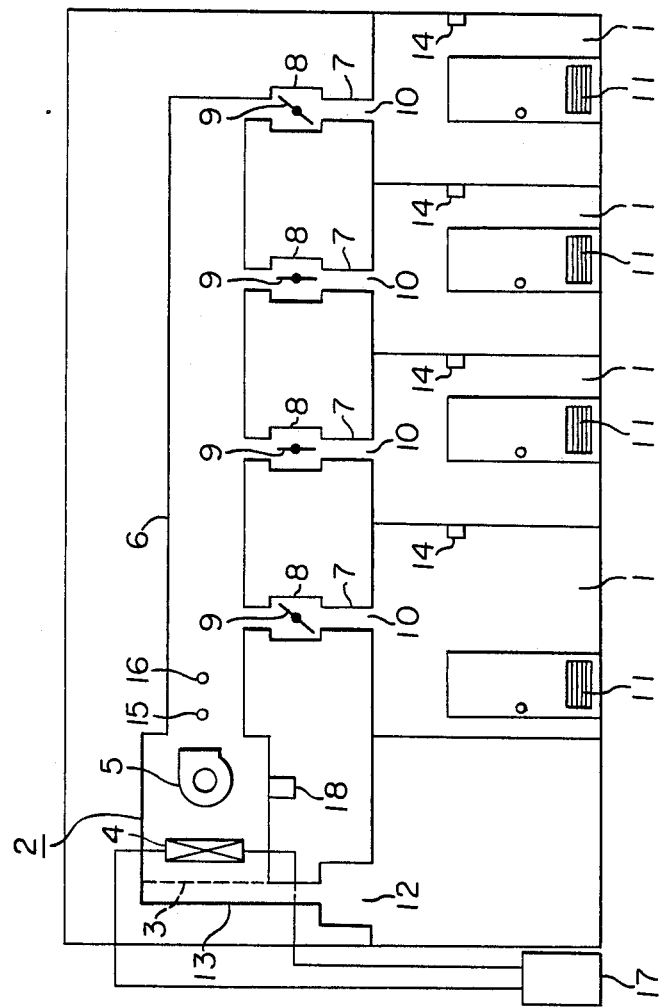

1

AIR CONDITIONING APPARATUS

BACKGROUND OF THE INVENTION

1. Field of the Invention

The present invention relates to a duct type air conditioning apparatus which utilizes a variable air quantity control system capable of regulating temperature in each room independently of the other. Particularly, it relates to the duct type air conditioning apparatus having a controller in which a temperature schedule and other programs are inputted.

2. Discussion of Background

There has so far been known a centralized air-conditioning system which carries out air conditioning by distributing temperature-regulated air to each room through an air duct. The conventional air conditioning system has various meritorious effects in comparison with a heat pump chiller/fan coil system, a package air-conditioner decentralized arrangement system and others from the viewpoint that it can easily incorporate a humidifier, a high performance filter, an external air introducing system and a total heat-exchanger, hence it is able to perform a high grade air conditioning operation. It can utilize the room space with high effectiveness because it is sufficient to form an outlet port and an intake port for the room to be air-conditioned, and it has the least disorder in its heat transporting system. Therefore, such central air conditioning system has been used widely for the air conditioning of a large-sized building. Of various central air conditioning systems, the variable air quantity control system capable of carrying out the energy-saving operations (hereinafter, referred to as "VAV system") is capable of controlling temperature in a plurality of rooms, each having different heat load, independently of the other, is capable of stopping the air-conditioning operation in those rooms which are not in used, is also able to reduce the running cost of the air conditioning system by changing the power for the air blower in accordance with quantity of air to be blown out, and, at the same time is able to decrease the capacity of the heat source device by taking into consideration of the rate of its use.

There are several types in the VAV system. As one system, there is a system which uses a throttle type VAV unit, in which pressure in the duct which varies depending on the degree of opening of the dampers is detected, and the capacity of the air blower is controlled so as to bring the value of pressure to a certain predetermined level. Therefore, when the heat load in the room decreases (even when the air quantity becomes small, the temperature of the air within the duct is controlled at a constant level), the required performance of the heat source device becomes small and the power for the air blower is also decreased.

As conventional techniques adopting the throttle type VAV unit, there are known those as in the Japanese Examined Patent Publication No. 47497/1985 and as shown in FIG. 2.10a in Manual of Refrigeration and Air-conditioning (new fourth edition, technique for application) published by Nippon Reito Kyokai.

FIG. 8 is a diagram showing the system of the conventional air conditioning apparatus. In FIG. 8, a reference numeral 1 designates rooms to be air-conditioned (in this case, four rooms are to be air-conditioned). A numeral 2 designates a room unit disposed in the ceiling of the building, and which is constructed with an air-filter 3, a heat exchanger 4 and an air blower 5. A main air duct 6 is connected to the air outlet port of the room unit 2, and four branch ducts 7 are diverged from the main air duct 6. A throttle type VAV unit 8 is placed in each of the branch ducts 7. A damper 9 is turnably fitted within each of the VAV unit 8, and which is driven by a stepping motor (not shown). An outlet port 10 is provided at the end part of the branch duct 7. An inlet port 11 is provided at the lower part of a door in the room 1. An inlet port 12 is formed in the ceiling board above the corridor. An inlet duct 13 connects the inlet port 12 of the ceiling to the air inlet port of the room unit 2. A room controller 14 is attached to each of the rooms 1. A temperature detector 15 and a pressure detector 16 are disposed in the main air duct 6. A heat source device 17 such as a heat pump is connected to the heat exchanger 4. A controlling apparatus for controlling the operations of the heat source device, the air blower 5 and the dampers 9 is disposed in the ceiling.

In the conventional air conditioning apparatus having the construction as described above, when a user determines an established room temperature by the room controller 14 placed in each of the rooms, the degree of opening of the dampers is regulated at their optimum positions in accordance with the established room temperature for each room and the current temperature in each of the rooms. Pressure in the main air duct 6 varies depending on the degree of opening of the dampers 9. The pressure is detected by the pressure detector 16, and the capacity of the air blower 5 is changed so that a predetermined established pressure is given. When the quantity of air blown is changed, the temperature of air at the outlet of the heat exchanger 4 is also changed. The temperature of the air is detected by the temperature detector 15 whereby the performance of the heat source device 17 is controlled so that a predetermined temperature of the air is given. Thus, the air regulated at a substantially constant temperature is blown into the rooms at flow rates depending on the magnitude of the heat load in each of the rooms. After the air-conditioning, the air in the rooms flows through the inlet port 11, the corridor, the inlet port 12 formed in the ceiling and the inlet duct 13 to be returned to the room unit 2. Such a series of control is carried out in the optimum manner by means of the controlling apparatus 18 so as to satisfy energy-saving and comfortableness on the basis of the detecting signals from the room controllers 14, the temperature detector 15, the pressure detector 16 and the various detectors (not shown) in the heat source device 17.

In the conventional air conditioning apparatus, however, a controlling operation in which the energy-saving and comfortableness are both satisfied has been insufficient. The reason is as follows. The conventional air conditioning apparatus adopting the VAV system has been used mainly for office buildings. In this case, the air conditioning apparatus is operated in the daytime in which each room is air-conditioned under substantially equal temperature condition, and its operation is stopped in holidays such as the weekends. Accordingly, the function to adjust the air quantity by the VAV unit is merely to maintain a room temperature in each of the rooms at constant level by increasing or decreasing the flow rates depending on the heat loads changing due to the orientation of the rooms, the number of persons in the rooms and so on. In the conventional air conditioning, apparatus, a program for operating the apparatus in given time zones and the stop of the operation in holidays is given to the controlling apparatus 18. In this case, the operation of air-conditioning for the room which is not in use can be stopped by the room controllers in the rooms.

There are many problems in the conventional air conditioning apparatus using the VAV system when it is applied to a private house. While energy can be greatly reduced by suitably controlling the apparatus, comfortableness for living may be impaired, or the operation of the apparatus becomes complicated and troublesome. For houses in U.S.A., duct type centralized air-conditioning systems are widely used. However, an air conditioning apparatus with automatic control of the VAV system is not practically used, and what is proposed is such a type that the degree of opening of the dampers is adjusted manually or by use of thermostats, or a set back value is used in certain time zones for an established temperature for the total system by using a timer. In the specification, "set back" means that when room warming operation is carried out, the established room temperature is shifted to a slightly lower value in the period of certain time, and when room cooling operation is carried out, it is shifted to a slightly higher level, thereby to save energy.

The conventional air conditioning apparatus is usually operated for all day and for all rooms. However, increase in the cost of energy in the recent years has increased the economic burden of the users and therefore, a system capable of saving energy is expected. Even though the conventional system accomplishes some amount of energy-saving by using the set back values, it can not greatly reduce the energy because of the lack of the function of a zoning control (namely, feeding of air is stopped to a room which does not require the air-conditioning). Further, the conventional air conditioning apparatus has the problems that it is troublesome to adjust the degree of the dampers, or open and close them by manual operations; efficiency of the apparatus decreases, and noise is increased because control of the capacity of the heat source apparatus and the air blower is not in association with the change of the air-flow rate.

Thus, the air conditioning apparatus adopting the VAV system is considered to be suitable for energy-saving in private houses. In this case, however, a special care is needed to save energy for each room. It is, therefore necessary to use a controller in which temperature schedules for the rooms are inputted. In this case, there is a problem that even though a program of temperature schedule is prepared so as to be in conformity with the life pattern of a family, the daily life is not always coincident with the actual life pattern. Therefore, it is necessary to easily change the program including data initially inputted.

Briefly stated, the following problem areas remain to be solved.

(1) A life pattern during the weekdays is different from that in the holidays.

(2) Actual life is not always coincident with the life pattern inputted in the controller.

(3) In the case that a room is frequently opened and closed, the temperature difference between the interior and the exterior of the room should be small, and the temperature in the room should reach a predetermined value as soon as possible.

(4) The zoning and the setting-back should realize remarkable energy-saving.

(5) The zoning and the setting-back should not impair comfortableness in the room.

(6) Operations of inputting and changing data should be simple.

As a controller used for an air conditioning apparatus for many rooms, there is known one as shown in Japanese Examined Utility Model Publication No. 8581/1985. The proposed air conditioning apparatus is of a type having a refrigerant piping instead of the duct type. In the published air conditioning apparatus, a plurality of room controllers and a main controller which functions as the room controllers are provided. Accordingly, an established room temperature of any room can be changed by the main controller. However, the air conditioning apparatus is not adapted to input a program for the temperature schedule and it is insufficient from the viewpoint of saving energy.

SUMMARY OF THE INVENTION

It is an object of the present invention to eliminate the disadvantages of the conventional air conditioning apparatus and to provide an air conditioning apparatus of a VAV system with a main controller and room controllers which can be easily operated and satisfies both advantages of energy-saving and comfortableness.

The present invention is to provide an air conditioning apparatus which comprises a heat source device for producing warm air or cool air; a heat exchanger connected to the heat source device; an air blower placed by the heat exchanger; an air duct which contains the heat exchanger and the air blower and distributes the warm air or the cool air from the heat exchanger to a plurality of rooms; air quantity adjusting dampers each of which regulates an air quantity to feed the warm air or the cool air to each of the rooms; a controlling apparatus for controlling the dampers, the heat source device and the air blower; a main controller connected to the controlling apparatus and provided with a room temperature detector; and a room controller provided with a room temperature detector, which is connected to the controlling apparatus and is installed in each of the rooms, wherein the main controller is further provided with an operation mode changing means; a temperature schedule inputting means for determining a temperature schedule for each of the rooms; an interactive input means for determining initial data; a first display means for displaying questions on the operations of the interactive input means and a temperature schedule by the temperature schedule inputting means; and a schedule selecting means for determining whether or not the room in which the main controller is installed is to be subjected to scheduled air-conditioning; and the room controller is further provided with a mode selecting means for determining whether or not the room in which the room controller is installed is to be subjected to scheduled air-conditioning; a room temperature setting means for determining an established temperature when the room is not subjected to the scheduled air-conditioning operation, and a second display means for displaying a room temperature.

Another aspect of the present invention is to provide an air-conditioning apparatus in which the main controller as described above is further provided with a fire alarming means for informing an abnormal condition when a fire occurs in any room.

BRIEF DESCRIPTION OF THE DRAWINGS

FIG. 8 is a diagram showing a conventional air controlling apparatus.

Preferred embodiments of the present invention will be described in detail with reference to the drawings.

DETAILED DESCRIPTION OF THE PREFERRED EMBODIMENTS

An operation mode changing means used in the present invention is adapted to control the operations of a heat source device, an air blower and other devices through a controlling apparatus so that the devices perform any operation mode of "stop", "cooling", "warming", or "air blowing".

A temperature schedule inputting means is adapted to input a temperature schedule for each room by operating time keys and a temperature key.

An interactive input means is to input initial data necessary to the operation of the system in a way of dialogue by operating "YES" key and "NO" key.

A first display means is to display questions necessary to input the initial data and a temperature schedule.

A schedule selecting means is to select a method of air-conditioning of the room provided with a main controller in accordance with information inputted by a schedule key.

A mode selecting means is to select a method of air-conditioning of the room provided with a room controller in accordance with information inputted by a mode key.

A room temperature setting means is to determine the room temperature of a room so that the room temperature in brought to a value inputted by a room temperature setting key.

A second displaying means is to display a room temperature and other information.

A fire alarming means is to inform an abnormal condition by means of a buzzer and other suitable means when a fire occurs.

In the following, the first embodiment of the present invention will be described with reference to FIGS. 1 to 7 in which the general construction of the air conditioning apparatus is basically the same as that shown in FIG. 8.

Figure 1:
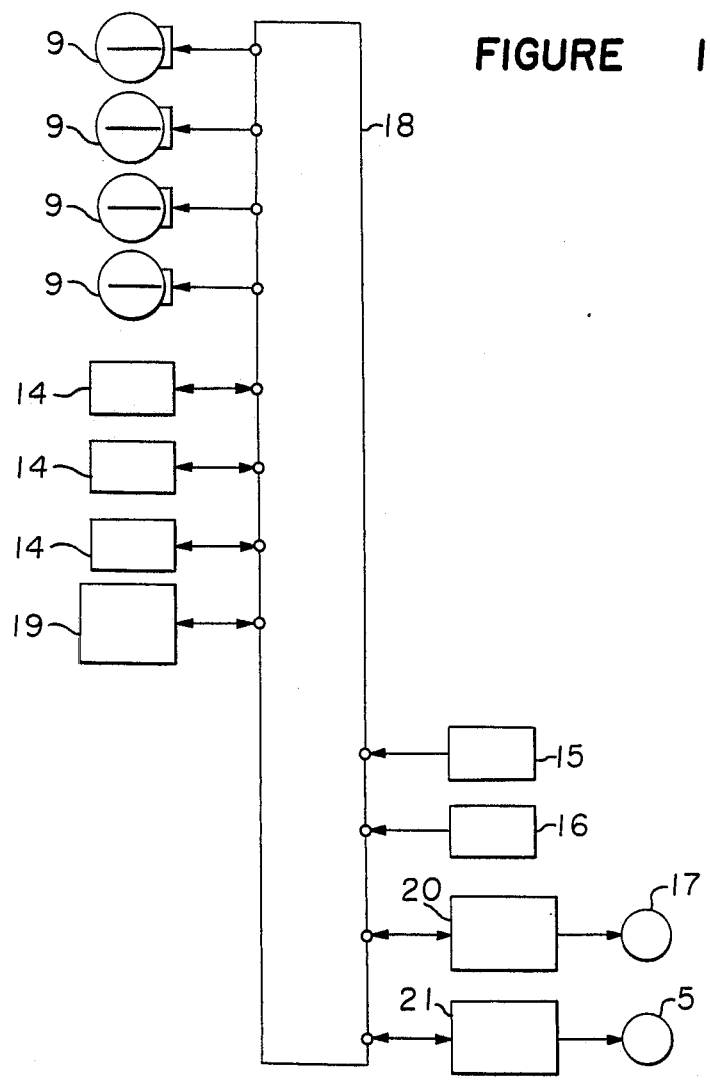
FIG. 1 is a diagram showing the entire construction of an embodiment of the air-conditioning apparatus according to the present invention.

In FIG. 1 showing a diagram of connection of electric parts, a main controller 19 is connected to a controlling apparatus 18 to determine an operation mode and to establish a program on a temperature schedule for each room. Three room controllers 14, four dampers 9, a temperature detector 15 and a pressure detector 16 are respectively connected to the controlling apparatus 18. Further, a heat source controlling apparatus which performs capacity control and operation control for a heat source device 17 such as a heat pump, and an air blower controlling apparatus 21 which performs capacity control for the air blower 5 are respectively connected to the controlling apparatus 18.

Microcomputers are respectively installed in the controlling apparatus 18, the main controller 19, the room controllers 14, the heat source controlling apparatus 20 and the air blower controlling apparatus 21 so as to transmit data held in these apparatuses under multiplex transmission. In this case, the controlling apparatus is preferably used as a parent machine to supervise the data signals. It is possible to construct the controlling apparatus 18, the heat source device controlling apparatus 20 and the air blower controlling apparatus 21 in one piece.

Figure 2:
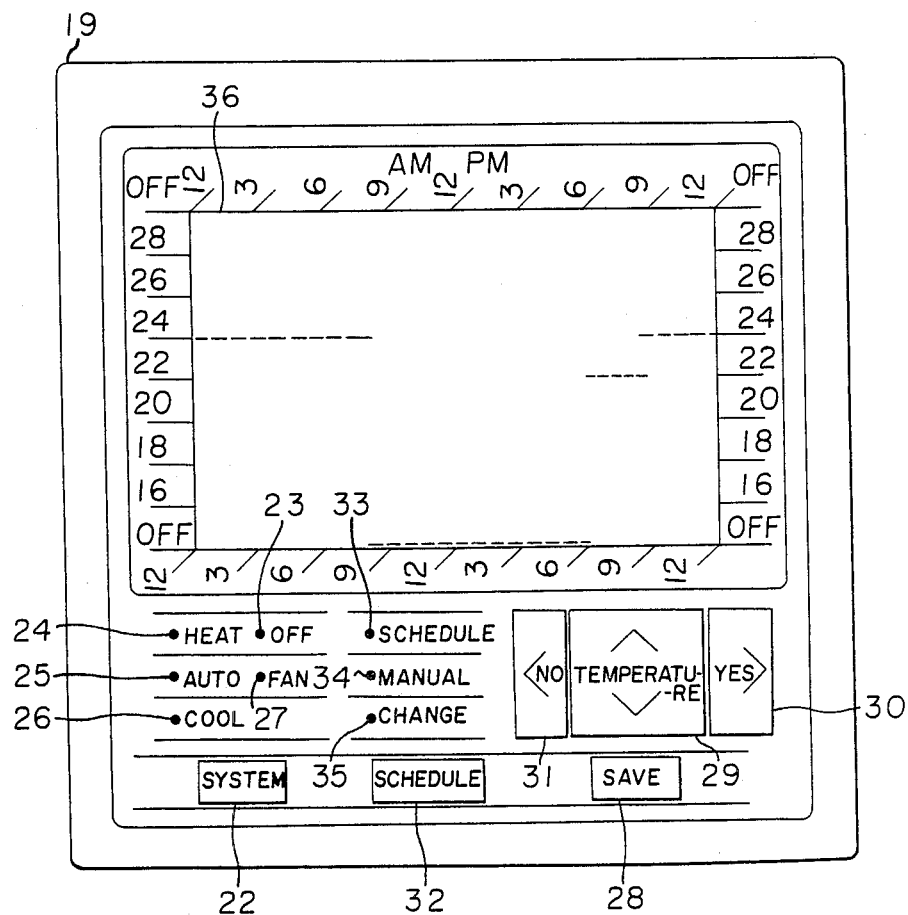
FIG. 2 is a front view of an embodiment of the main controller used for the air-conditioning apparatus.

FIG. 2 is a front view of the main controller 19. In FIG. 2, a reference numeral 22 designates a system key which functions as the operation mode changing means and numerals 23 to 27 designate light emitting diodes (LEDs) for displaying "stop" mode, "warming" mode, "automatic" mode, "cooling", and "air blowing" mode which are related to the system key 22.

Function keys 28 to 31 constitute the temperature schedule inputting means, in which a numeral 28 designates an input key, a numeral 29 designates a temperature key and numerals 30 and 31 designate time keys. The time keys 30 and 31 are respectively used in common with an YES key 30 and a NO key 31 which constitute the interactive input means. A numeral 32 designates a schedule key as the schedule selecting means. Numerals 33 to 35 designate light emitting diodes for indicating a scheduled air-conditioning mode, a manual air-conditioning mode and a schedule changing mode respectively, all of which are related to the schedule key 32. A numeral 36 designates a first display means consisting of liquid crystal display devices.

Figure 3:
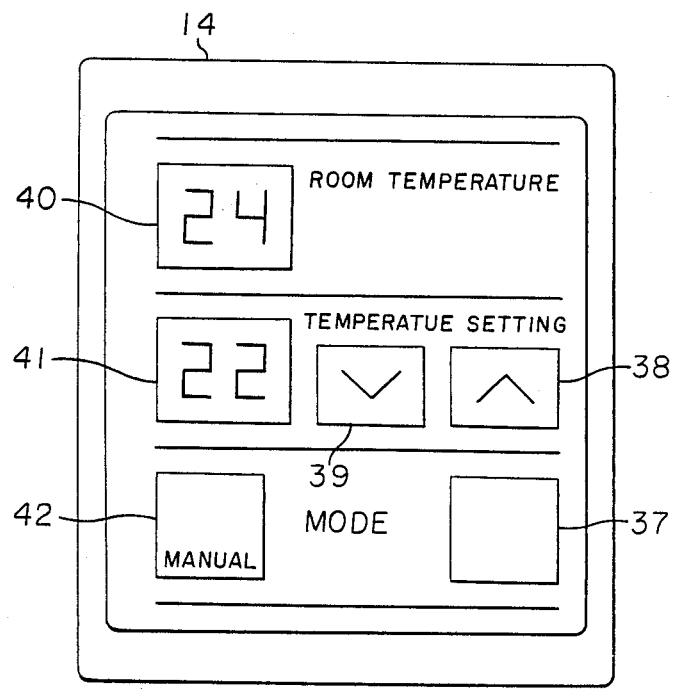
FIG. 3 is a front view of an embodiment of the room controller used for the air-conditioning apparatus.

FIG. 3 is a front view of an embodiment of the room controller 14 in which a numeral 37 designates a mode key as the mode selecting means, numerals 38 and 39 designate room temperature setting keys as the room temperature setting means, and numerals 40 to 42 designate indicators which constitute a second display means consisting of liquid crystal display devices. The indicator 40 displays room temperature in the room where the room controller 14 is placed, the indicator 41 displays an established room temperature and the indicator 42 displays any of three modes (stop, scheduled air-conditioning and manual air-conditioning) which correspond to the operations of the mode key 37.

Figure 4:
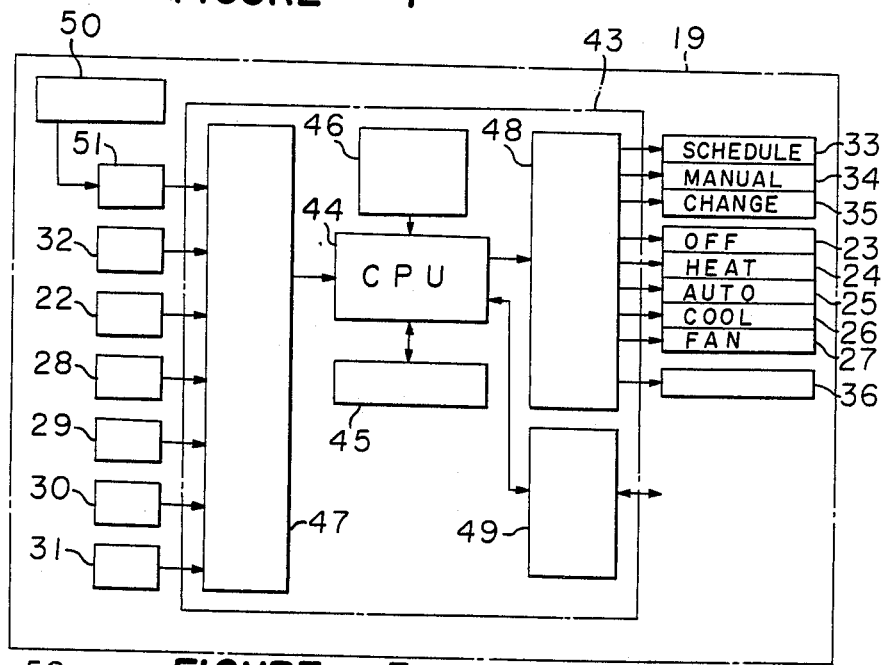
FIG. 4 is a diagram showing an embodiment of the inner circuit of the main controller.

FIG. 4 is a diagram showing the inner circuit of the main controller 19. In FIG. 4, a numeral 43 designate a microcomputer which comprises a central processing unit 44 (hereinbelow, referred to as a CPU), a memory 45 for storing data of a controlling program and results of the operation in the CPU, a clock generating section 46, an input unit 47 connected to the CPU 44, an output unit 48 and a communication unit 49.

The system key 22, the function keys 28 to 31 and the schedule key 32 are connected to the input unit 47. A room temperature detector 50 which may be a thermister is also connected to the input unit 47 through an A/D transducer 51.

The LEDs 23 to 27 and 33 to 35 for displaying the various modes are connected to the output unit 48. The first display means 36 is also connected to the output unit 48 through a driving circuit (not shown).

The communication unit 49 is connected to the controlling device 18.

Figure 5:
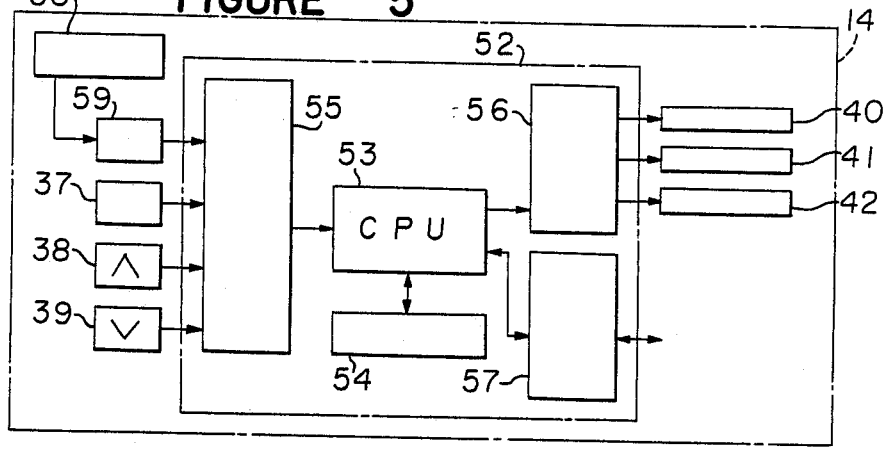
FIG. 5 is a diagram showing an embodiment of the inner circuit of the room controller.

FIG. 5 is diagram showing the inner circuit of the room controller 14 in which a numeral 52 designates a microcomputer which comprises a CPU 53, a memory 54 for storing data of a controlling program and the results by operations in the CPU 53, an input unit 55 connected to the CPU 53, an output unit 56 and a communication unit 57. A room temperature detector 58 which may be a thermister is connected to the input unit 55 through an A/D transducer 59. The mode key 37 and the temperature setting keys 38, 39 are connected to the input unit 55.

The indicators 40 to 42 which constitute the second display means are connected to the output unit 46.

The communication unit 57 is connected to the controlling apparatus 18.

Figure 6:
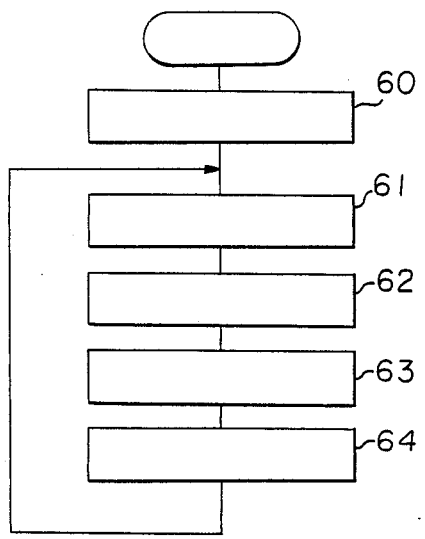
FIG. 6 is a flow chart showing the steps for the operations of the main controller.
Figure 7:
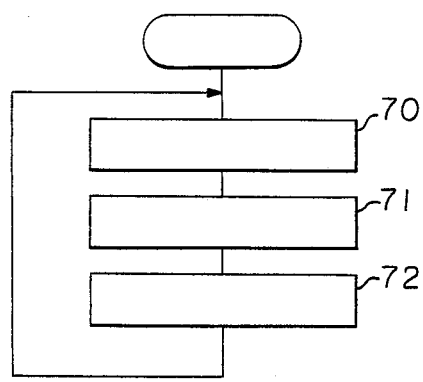
FIG. 7 is a flow chart showing the steps for the operations of the room controller.

The operation of the first embodiment according to the present invention will be described with reference to FIG. 6 showing a flow chart of the operation of the main controller and FIG. 7 showing a flow chart of the operation of the room controller.

On completion of the installation of an air conditioning system, initial data for operating the system is inputted through the main controller 19 (Step 60). The inputting operations are carried out by a technician or a user. A special operation is needed for the microcomputer 43 in the main controller 19 to enter into an initially set mode which have been initially determined through the main controller. Namely, it is effected by, for instance, pushing a key on the front of the main controller 19 several times or pushing simultaneously two keys of the main controller 19. For the initially set mode, data necessary to control the operations of the system are inputted in the memory 45 of the microcomputer 43 so that an operator has a conversation with the microcomputer.

First of all, a question is displayed on the first display means 36. The operator gives an answer of YES or NO by operating the answer key 30 or 31 (which also functions as the time key) to the question. For the questions, there are the present time (year, month, day, hour, minute), kinds of apparatuses and devices used (a kind of heat source device, a kind of optional parts), the number of time zones to be air-conditioned (the number of the dampers 9) and so on. For instance, when time is to be inputted, the following question is displayed. "Is it 1980 this year?" If the operator gives an answer of NO by pushing the answer key 31, the indication on the first display means 36 is changed, by which 1981 is displayed and the number of years is successively increases. When the operator pushes the answer key 30 to give an answer of YES at a number which the operator thinks it correct, the number is stored in the memory 45. Then, the next question of "Is this month January?" is given.

When the operator is to input a kind of a usable device, a question of "Is a heat pump used?" is displayed, for instance. To this question, an answer of YES or NO is given. The signal by the answer key 30 or 31 is inputted to the CPU 44 through the input unit 47, and among the signals, necessary data are memorized in the memory 45. The questions are displayed on the first display means 36 consisting of the LCDs by means of letters and numerals through the memory 45, the CPU 44 and the output unit 48. The questions are displayed in accordance with a previously determined order and the answers are given to each of the questions. When an answer to the last question is given, the initially set mode is automatically over.

The data inputted for the initially set mode are stored in the memory 45 together with the data for the temperature schedule, or they are stored in a memory (not shown) of the microcomputer installed in the controlling apparatus 18 through the communication unit 49 after the completion of the initially set mode. In either case, the data are stored in an EEP-ROM or a similar device so as not to be cancelled due to a service interruption.

Ordinary operations are conducted after the initially set mode, and Steps 61 to 64 are repeatedly carried out. At Step 61, one of "stop" mode, "air blowing" mode, "warming" mode, "automatic" mode and "cooling" mode is selected. A mode is changed to another by operating the system key 22. The present situation is displayed by any of the LEDs 23 to 27.

At Step 62, selection of the temperature schedule is made. Namely, any of the scheduled air-conditioning, the manual air-conditioning or the schedule changing is selected by the operation of the schedule key 32. One of the LEDs 33 to 35 is lit as a result of the selection. When the system is installed is in a building, each room has a temporary temperature schedule. Accordingly, the schedule key 32 is operated to bring the temperature schedule to the item of "change of schedule". In the schedule changing mode, the temperature schedule for each of the rooms is inputted in the memory 45 by means of time keys 30, 31, the temperature key 29 and the input key 28, the inputting operations being carried out in a conversation style with the first displaying means. The temperature schedule can be inputted for each of the rooms, and the input of a room-cooling schedule or a room-warming schedule can also be done.

The questions for inputting the temperature schedule is given on the basis of the data of the initially set mode which has been utilized before. If there are four air-conditioning zones, questions for four rooms are given. If a heat pump is used as the heat source device, questions are given as to both the air-cooling schedule and the air-warming schedule. In an air conditioner is used, question is given only for the room-cooling schedule Further, the temperature schedule is changeable depending on weekdays. Preferably, the temperature schedule is classified into three temperature schedules for Monday to Friday, Saturday and Sunday. The input of the temperature schedule is conducted as follows. The abscissa in the first display means 36 as shown in FIG. 2 is used as a time axis and the ordinate thereof is used as a temperature axis, and the temperature schedule is displayed in a form of graph with linear lines in a dot matrix formed by the LCDs. When the upper part of the temperature key 29 is pushed, the established room temperature increases by 1° C. (1 dot), whereas the lower part of the temperature key 29 is pushed, it decreases by the same value. When the time key 30 or 31 is pushed, the established temperature is shifted by 1 dot on the left side or the right side (or a certain amount of time such as 30 minutes or 1 hour). Further, when the time key 30 is continuously pushed for a period of time, the time is automatically corrected to be 0 o'clock. Similarly, when the time key 31 is continuously pushed for a period of time, the time is automatically shifted from 0 o'clock to 24 o'clock.

On completion of the preparation of the temperature schedule for a room, the data of the thus prepared schedule are stored in the memory 45 by the operation of the input key 28, and the temperature schedule for another room is to be prepared. In this case, the system may possess a function of duplication to save manual work for inputting the temperature schedule for each of the rooms. For example, the system may be so contrived that a question of "Is it the same schedule as another room?" is given at the top of the preparation of the temperature schedule for each of the rooms, and when the operation inputs the room number of a specified room, then, all data for this room are completed. Thus, when the temperature schedules have been inputted for all of the rooms, the schedule changing mode is over.

When selection of the scheduled air-conditioning mode is made by the schedule key 32, the room in which the main controller is installed is controlled on the basis of the previously inputted temperature schedule. In the temperature schedule, when an established room temperature is determined at the uppermost part on the first display means 36 at a certain time during the room-cooling operation, or at the lower most part at a certain time during the room-warming operation, it is considered to be in the condition of stop in air-conditioning. When the manual air-conditioning mode is selected by the schedule key 32, a continuous air-conditioning operation is carried out at an established room temperature regardless of the temperature schedule. In this case, the established room temperature is determined by the temperature key 29. Selection of the scheduled air-conditioning, the manual air-conditioning and the schedule changing by the operation of the schedule key 32 can be carried out in any operation mode selected by the system key 22.

In the display mode of the next Step 63, the room temperature in the present condition or both of the room temperature and the established room temperature for each of the rooms are displayed in a form of bar graph on the first display means 36 in the normal operations. When an abnormal condition takes place in the system, letters indicative of the abnormal condition are displayed on the display means 36.

In the communication mode of Step 64, various data inputted by the main controller 19 and room temperature values detected by the room temperature detector 50 are transmitted to the controlling apparatus 18 through the communication unit 49 to be used as data for controlling the operation of the system. The controlling apparatus 18 also transmits necessary data to the main controller 19.

The main controller 19 repeatedly performs the operations of Steps 61 to 64.

The room controller 14 performs the operations of steps 70 to 72. At Step 70, selection of mode i.e. a stop mode, a scheduled air-conditioning mode and a manual air-conditioning mode, is made by the operation of the mode key 37. The "stop" mode stops the air-conditioning of the room. The "scheduled air-conditioning" mode gives air-conditioning operation in accordance with the temperature schedule determined by the main controller 19. The "manual air conditioning" mode gives a continuous air-conditioning operation at an established room temperature regardless of the temperature schedule. In this case, the established room temperature is determined by the operation of the room temperature setting keys 38, 39. Signals by the mode key 37 and the room temperature setting keys 38, 39 are transmitted to the CPU 53 through the input unit 55 to be stored in the memory 54. The signals in the CPU 53 and the memory 54 are outputted on the second display means 40 to 42 through the output unit 56 (Step 71). The indicator 40 displays the room temperature at the current condition detected by the temperature detector 58; the indicator 41 displays the established room temperature in the scheduled air-conditioning operation or the manual air-conditioning operation, and the indicator 42 displays a currently existing mode by means of LCDs.

It may happen that the room temperature value is slightly deflected from the established room temperature depending on accuracy in the room temperature detector 58. Also, there may occur hunting of the established room temperature with respect to a given value depending on control of the dampers. Accordingly, when the room temperature and the established room temperature are simultaneously displayed on the second display means, i.e. the indicators 40, 41 and if the room temperature value is within a permissible range of the upper and lower limits of the established room temperature, the same value as the established room temperature is displayed.

In the communication mode of Step 72, data inputted by the room controller 14 and the room temperature value are transmitted to the controlling apparatus 18 through the communication unit 57. The controlling apparatus 18 also transmits the data such as the temperature schedule and so on to the room controller 14.

The embodiment described above has the main controller 19 by which three modes, i.e. the scheduled air-conditioning, the manual air-conditioning and the schedule changing, can be provided and these three modes are changed by the operation of the schedule key 32. However, the main controller 19 is so adapted that the schedule changing mode may be selected by the operation the other key. The main controller 19 may have the schedule selecting means which has three modes, i.e. a stop mode, a scheduled air-conditioning mode and a manual air-conditioning mode in the same manner as in the mode selecting means of the room controller 14, whereby the air conditioning operation is stopped in the manual air-conditioning mode.

The room controller 14 may have the mode selecting means by which either of two modes, i.e. a scheduled air-conditioning mode and a manual air-conditioning mode, is selected so that when the air conditioning operation of the room is to be stopped, the manual air-conditioning mode is taken, while the established room temperature is brought to the upper limit value in the room-cooling operation, or the established room temperature is brought to the lower limit value in the room-warming operation.

In the above-mentioned embodiment, description has been made as to the air conditioning system provided with the dampers 9 and the room controllers 14. However, it is feasible that the main controller 19 may have functions and operations which allow use of it as the all-room air conditioner similar to the conventional system without connection of the dampers and the room controllers.

FIGS. 4 and 5 show the second embodiment of the present invention.

In the second embodiment, a fire alarming means is added to the first embodiment so that each of the room in a private house is provided with the fire alarming means.

The second embodiment will be described with reference to FIGS. 4 and 5. Detection signals from the room temperature detector 50 or 58 in the rooms is transmitted to the main controller 19 which contains the fire alarming means. The main controller 19 is so constructed that when the room temperature is higher than an allowable temperature range, a sign of abnormality is displayed on the first display means 36 and at the same time, an alarming sound is generated from a buzzer (not shown) installed in the main controller 19.

In the second embodiment, the heat source device 17 may be a gas furnace, the combination of a heat pump and a gas furnace, the combination of a heat pump and an electric heater, an air conditioner, the combination of an air conditioner and a gas furnace, the combination of an air conditioner and an electric heater, instead of the heat pump.

As auxiliary devices used in combination with the heat source device, a humidifier, an air cleaner, a total heat exchanger and so on may be used.

For the combination of the main air duct 6 and the branch ducts 7, a chamber including plurality of the dampers 9 may be attached to the outlet port of the room unit 2 and flexible ducts are extended so that the chamber and the outlet ports 10 are connected.

The dampers 9 may be controlled in such a way that the degree of opening of each of the dampers is proportionally controlled depending on temperature difference between the room temperature and the established room temperature so that air is blown out in correspondence to a heat load, or the dampers 9 are blowed into two positions of entirely opening or entirely closing depending on the temperature difference. The air conditioning apparatus according to the present invention has advantages as follows.

(1) Initial data necessary to control the operations of the air conditioning system can be easily inputted by the interactive input means.

(2) The temperature schedule for each of the rooms is finely and precisely adjusted so that both energy-saving and comfortableness are satisfied.

(3) When a life pattern is to be temporarily changed, change in mode from the scheduled air-conditioning to the manual air-conditioning can be easily made at each room, as a result that comfortablenes is improved. Further, the air conditioning operation for each room can be easily stopped to save energy.

(4) The operation can be easy because the operation system employs a conversation style on the display means. Further, supervisory observation of the air-conditioning condition for each room is obtainable, and therefore, an abnormal condition can be quickly recognized on the display means.

(5) A firing accident can be quickly informed.

Thus, in accordance with the air conditioning apparatus of the present invention, the main controller is provided with a temperature schedule inputting means, an interactive input means, a first display means and a schedule selecting means, and each room controller is provided with a mode selecting means, a room temperature setting means and a second displaying means. Accordingly, a scheduled air-conditioning operation for a manual air-conditioning operation can be provided by any of the controllers, whereby both advantages of saving-energy and comfortableness are satisfied and the system can be easily operated. Further, an abnormal firing can be quickly detected.

We claim:

1. An air-conditioning apparatus comprising:

means for producing temperature controlled air including a heat source device and a heat exchanger device connected to said heat source;

means for delivering said temperature controlled air to each one of a plurality of rooms said means including an air-blower placed in the vicinity of said heat exchanger and an air-duct system containing said heat exchanger and said air blower wherein said air-duct system distributes said air from said heat exchanger to said plurality of rooms;

a plurality of air quantity adjusting dampers each of which is associated with a respective one of said rooms in order to regulate the air quantity fed to each of said rooms;

a controlling apparatus for controlling said dampers, said heat source device and said air-blower;

a main controller connected to said controlling apparatus wherein said main controller is provided with a room temperature detector; and a room controller provided in each of said rooms including a room temperature detector which is connected to said controlling apparatus, wherein;

said main controller is further provided with an operation mode changing means, a temperature schedule inputting means for determining a temperature schedule for each of said rooms at all times, an interactive input means for determining initial data, a first display means having a first portion for displaying questions on the operations of said interactive input means and a temperature schedule by said temperature schedule inputting means, said main controller further including a schedule selecting means for determining whether or not the room in which said main controller is installed is to be subjected to scheduled air-conditioning;

and wherein said room controller is further provided with a mode selecting means for determining whether or not the room in which said room controller is installed is to be subjected to scheduled air-conditioning, said room controller further including a room temperature setting means for determining an established room temperature when said room is not in the scheduled air-conditioning and a second display means for displaying a temperature of said room.

2. The air conditioning apparatus according to claim 1, wherein said temperature schedule input means comprises time keys for controlling a time axis on a second portion of said first display, a temperature key for controlling a temperature axis also on said second portion and an input key for storing a temperature schedule for a day in a memory space in a microcomputer.

3. The air conditioning apparatus according to claim 1, wherein said interactive input means comprises two answer keys of "YES" and "NO" to respond to questions from a microcomputer.

4. The air conditioning apparatus according to claim 3, wherein said keys for the interactive input means are commonly used as keys for said temperature schedule input means.

5. The air conditioning apparatus according to claim 1, wherein said first display means is constituted by liquid crystal display devices and is adapted to display on its display surface a temperature schedule in a form of graph and questions by letters.

6. The air conditioning apparatus according to claim 1, wherein said schedule selecting means has a schedule key for selecting one of a scheduled air-conditioning operation and a manual air-conditioning operation in which the scheduled air-conditioning operation is to carry out the air-conditioning of the room provided with said main controller in accordance with a temperature schedule determined through said temperature schedule inputting means, and said manual air-conditioning operation is to carry out the air-conditioning of the room at a predetermined established room temperature regardless of the temperature schedule.

7. The air-conditioning apparatus according to claim 6, wherein when the manual air-conditioning operation is selected by said schedule selecting means, the established room temperature is determined by the operation of said temperature schedule inputting means.

8. The air conditioning apparatus according to claim 1, wherein said schedule selecting means has a schedule key for selecting one of a scheduled air-conditioning operation, a manual air-conditioning operation and the stop of the air-conditioning operation, in which the scheduled air-conditioning operation is to carry out air-conditioning of the room provided with said main controller in accordance with the temperature schedule determined through said temperature schedule inputting means and said manual air-conditioning operation is to carry out the air-conditioning at a predetermined established room temperature regardless of the temperature schedule.

established room temperature is determined by the operation of said temperature schedule inputting means.

9. The air conditioning apparatus according to claim 8, wherein when the manual air-conditioning operation is selected by said schedule selecting means, the established room temperature is determined by the operation of said temperature schedule inputting means.

10. The air conditioning apparatus according to claim 1, wherein said mode selecting means has a mode key for determining a scheduled air-conditioning operation or a manual air-conditioning operation in which the scheduled air-conditioning operation is to carry out the air-conditioning of the room provided with said room controller in accordance with the temperature schedule determined through said temperature schedule inputting means and the manual air-conditioning operation is to carry out the air-conditioning of the room at the established room temperature determined by said room temperature setting means regardless of the temperature schedule.

11. The air conditioning apparatus according to claim 1, wherein said mode selecting means has a mode key for selecting one of a scheduled air-conditioning operation a manual air-conditioning operation and stopping of air-conditioning operation in which the scheduled air-conditioning operation is to carry out the air-conditioning of the room provided with said room controller in accordance with the temperature schedule determined by said temperature schedule inputting means and the manual air-conditioning operation is to carry out the air-conditioning of the room at the established temperature determined by said room temperature setting means regardless of the temperature schedule.

12. The air conditioning apparatus according to claim 1, wherein the second displaying means is adapted to display a room temperature and only an established room temperature inputted by said room temperature setting means and an established value of room temperature at the current time which is inputted by said temperature schedule inputting means.

13. The air conditioning apparatus according to claim 12, wherein said second display means is adapted to display the same value as the established value as an room temperature when the room temperature is within a predetermined range with respect to the established value.

14. The air conditioning apparatus according to claim 1, wherein the temperature schedule for each of the rooms inputted by said temperature schedule inputting means includes a room cooling schedule and a room warming schedule.

15. The air conditioning apparatus according to claim 14, wherein said temperature schedule inputting means is adapted to duplicate the temperature schedule when the same temperature schedule as the previously inputted schedule is used again.

16. The air conditioning apparatus according to claim 1, wherein the temperature schedule for each of the rooms inputted by said temperature schedule inputting means includes a plurality of patterns in a week.

17. The air-conditioning apparatus according to claim 16, wherein the patterns of the temperature schedule are classified into a pattern for Monday through Friday, a pattern of Saturday and a pattern of Sunday and a national holiday.

18. The air conditioning apparatus according to claim 16, wherein said temperature schedule inputting means is adapted to duplicate the temperature schedule when the same temperature schedule as the previously inputted schedule is used again.

19. The air conditioning apparatus according to claim 1, wherein said temperature schedule inputting means is adapted to successively input data inclusive of from 24 o'clock to 0 o'clock for the temperature schedule and vice versa.

20. The air conditioning apparatus according to claim 1, wherein said first display means is adapted to display at least one of the room temperatures for all rooms and the established values, in a form of graph in the normal operations of the air-conditioning apparatus.

21. The air-conditioning apparatus according to claim 1, wherein said first display means is adapted to display an abnormal condition by letters when an abnormal condition takes place in the operating system.

* * * * *